US007917622B2

(12) United States Patent
Sugimoto et al.

(10) Patent No.: US 7,917,622 B2
(45) Date of Patent: Mar. 29, 2011

(54) CONTENT DELIVERY SYSTEM VIA A COMMUNICATION NETWORK

(75) Inventors: Ryotaro Sugimoto, Shizuoka (JP); Takeshi Ando, Hamamatsu (JP); Seiji Abe, Hamamatsu (JP); Shinya Sakurada, Hamamatsu (JP)

(73) Assignee: Yamaha Corporation (JP)

( * ) Notice: Subject to any disclaimer, the term of this patent is extended or adjusted under 35 U.S.C. 154(b) by 1170 days.

(21) Appl. No.: 11/559,421

(22) Filed: Nov. 14, 2006

(65) Prior Publication Data

US 2007/0118847 A1    May 24, 2007

(30) Foreign Application Priority Data

Nov. 18, 2005   (JP) ................................. 2005-334802

(51) Int. Cl.
*G06F 15/173* (2006.01)
*G06F 21/00* (2006.01)
(52) U.S. Cl. ......................................... 709/225; 705/56
(58) Field of Classification Search .................. 709/217, 709/218, 249, 238, 232, 224, 225, 226; 705/26, 705/28, 35, 37, 56; 707/600, 607, 645; 370/230, 370/231, 232, 352, 389, 229, 254, 360
See application file for complete search history.

(56) References Cited

U.S. PATENT DOCUMENTS

| 6,064,980 | A | 5/2000 | Jacobi et al. |
| 6,782,370 | B1 | 8/2004 | Stack |
| 6,947,922 | B1 | 9/2005 | Glance |
| 7,113,983 | B1 | 9/2006 | Terada et al. |
| 7,547,841 | B2 | 6/2009 | Furuta |
| 7,756,793 | B2 * | 7/2010 | Murase et al. .................. 705/59 |
| 2003/0078941 | A1 | 4/2003 | Kawakami et al. |
| 2005/0144499 | A1 | 6/2005 | Narahara et al. |
| 2005/0251690 | A1* | 11/2005 | Kuno et al. ................... 713/189 |
| 2007/0033147 | A1* | 2/2007 | Kaburagi ........................ 705/59 |
| 2008/0046587 | A1* | 2/2008 | Sakoh et al. .................. 709/234 |

FOREIGN PATENT DOCUMENTS

| JP | 8-195726 A | 7/1996 |
| JP | 2001-36423 A | 2/2001 |
| JP | 2002-108349 A | 4/2002 |

(Continued)

OTHER PUBLICATIONS

Notice of Grounds for Rejection (Office Action) issued in corresponding Japanese Patent Application No. 2005-334802 dated Feb. 23, 2010.

(Continued)

*Primary Examiner* — Joseph E Avellino
*Assistant Examiner* — Mark O Afolabi
(74) *Attorney, Agent, or Firm* — Rossi, Kimms & McDowell LLP

(57) ABSTRACT

On the basis of information of a first user, requesting delivery of content, received from a content reproduction apparatus, a content providing server refers to first and second storage section, as necessary, to specify a second user having purchased or reproduced the same content as the first user, then identify other music content having ever been purchased or reproduced by the second user and then delivers the other content to the first user. The content reproduction apparatus can store the content, delivered from the content providing server, in an overwriting fashion and reproduce the stored content. In this way, the first user is allowed to readily acquire various music content, fitting his or her taste, without performing any particular operation.

3 Claims, 4 Drawing Sheets

FOREIGN PATENT DOCUMENTS

| | | |
|---|---|---|
| JP | 2003-122791 A | 4/2003 |
| JP | 2004094730 A | 3/2004 |
| JP | 2005-167628 A | 6/2005 |
| JP | 2005-300772 A | 10/2005 |

OTHER PUBLICATIONS

Notice of Grounds for Rejection cited in corresponding application No. 2005-334802, dated Jun. 8, 2010.

* cited by examiner

CONTENT DELIVERY SYSTEM VIA A COMMUNICATION NETWORK

BACKGROUND OF THE INVENTION

The present invention relates to a content delivery system which delivers content via a communication network, content reproduction apparatus and content providing server constituting the content delivery system, and computer programs for use in the content delivery system, content reproduction apparatus and content providing server. More particularly, the present invention concerns an improved technique for automatically presenting or delivering various content fitting users' preferences or tastes.

With the recent development of communication networks, such as the Internet, any interested user can readily acquire a desired music piece, desired ringer tone or melody, desired musical score or any other desired music-related content (hereinafter referred to as "music content"), by just connecting his or her user terminal equipped with a communication function (hereinafter referred to as "client" or "client apparatus"), such as a portable communication terminal like a portable phone or PDA (Personal Data (or Digital) Assistance), personal computer terminal or electronic music apparatus, to a communication network. In this way, the user can enjoy the acquired music content by reproducing or visually displaying the content via the client. For example, when a user wants to acquire music content to reproduce a music piece, it is necessary for the user to personally search for the desired music piece from a multiplicity of music pieces scattered in a plurality of content providing servers (hereinafter also referred to simply as "servers"). For such a purpose, it has been possible for the user to find desired music content by sequentially accessing various servers and searching listings of music pieces, supplied by the individual servers, on the basis of information already known to the user, such as the title of the desired music piece, or by receiving a program, including one or more items of music content, delivered from a server so that the user can test-listen, as necessary, to the one or more items of music content supplied as the program by the server (so-called test-listening service). Among examples of content delivery techniques is the one disclosed in Japanese Patent Application Laid-open Publication No. 2001-036423.

Such test-listenable music content delivered from a server to a client via a communication network is usually music content predefined as a "program" by an information provider (e.g., content provider, or information delivery service operator). But, it tends to be difficult and laborious or troublesome for the information provider to prepare in advance various programs reflecting different tastes and tendencies of many users. Thus, if a user wants music content fitting his or her taste (also referred to as user-preferred music content) to be delivered, the user has no choice but to search for a particular program, containing user-preferred music content, through his or her labor, which however tends to be very troublesome and time-consuming. Besides, such a program often contains other music content in addition to the one fitting his or her taste. Thus, it has so far been impossible from a user to efficiently acquire music content fitting his or her taste.

SUMMARY OF THE INVENTION

In view of the foregoing, it is an object of the present invention to provide a content delivery system which allows individual users to readily acquire various content fitting their tastes, content reproduction apparatus and content providing server constituting the content delivery system and computer programs for use in the content delivery system, content reproduction apparatus and content providing server.

In order to accomplish the above-mentioned object, the preset invention provides an improved content delivery system for communicating content between a content reproduction apparatus and a content providing server interconnected via a communication network, in which the content providing server includes: a communication device that communicatably connects with a content reproduction apparatus via a communication network; a first storage section that stores a plurality of content and stores, for each of the content, one or more users having ever purchased or reproduced the content; a second storage section that stores, for each of a plurality of users, information indicative of content having ever been purchased or reproduced by the user; a reception control section that receives, from the content reproduction apparatus, information of a first user requesting delivery of content along with a content delivery request; an extraction section that, by referring to the second storage section on the basis of the information of the first user received by the reception control section, extracts information indicative of one or more content having ever been purchased or reproduced by the first user; a user specification section that, by referring to the first storage section on the basis of the information indicative of one or more content extracted by the extraction section, searches for one or more other users than the first user who have ever purchased the extracted one or more content, and that specifies any one of the searched-out other users as a second user; a content identification section that, by referring to the second storage section, identifies one or more content having ever been purchased or reproduced by the second user identified by the user specification section; and a content providing section that presents and/or delivers, to the content reproduction apparatus, any of the one or more content, identified by the content identification section, that has not been purchased or reproduced by the first user, and in which the content reproduction apparatus includes: a communication device that communicatably connects with a content providing server via a communication network; a transmission control section that transmits, to the content providing server, information of a first user requesting delivery of content along with a content delivery request; a reception control section that receives one or more content delivered by the content providing server; a content storage section that stores the content, delivered and received from the content providing server, in an overwriting fashion; and a reproduction section that reproduces the content stored in the content storage section.

In delivering content, the content providing server in the system of the present invention refers to the first and second storage sections, on the basis of the information of the first user received from the content reproduction apparatus, to specify the second user, having ever purchased or reproduced the same content as purchased or reproduced by the first user, and identify other content which the second user has purchased or reproduced before, and thence the content providing server transmits the identified content to the first user. In turn, the content reproduction apparatus stores the content, delivered and received from the content providing server, in an overwriting fashion and reproduces the content stored in the content storage section. In this way, the first user is allowed to readily acquire various music content, fitting his or her taste, without performing any particular operation.

Namely, the content providing server finds at least one second user having ever purchased or reproduced the same content as purchased or reproduced by the first user requesting delivery of given content and then automatically presents or delivers, to the first user, other content having been purchased or reproduced before by the second user, presuming that the second user has generally the same preference or taste as the first user. Such arrangements allows the first user to readily acquire various music content, fitting his or her taste, without performing any particular operation.

According to another aspect of the present invention, there is provided an improved content providing server, which comprises: a communication device that communicatably connects with a content reproduction apparatus via a communication network; a first storage section that stores a plurality of content and stores, for each of the content, one or more users having ever purchased or reproduced the content; a second storage section that stores, for each of a plurality of users, information indicative of content having ever been purchased or reproduced by the user; a reception control section that receives, from the content reproduction apparatus, information of a first user requesting delivery of content along with a content delivery request; an extraction section that, by referring to the second storage section on the basis of the information of the first user received by the reception control section, extracts information indicative of one or more content having ever been purchased or reproduced by the first user; a user specification section that, by referring to the first storage section on the basis of the information indicative of one or more content extracted by the extraction section, searches for one or more other users than the first user who have ever purchased the extracted one or more content, and that specifies any one of the searched-out other users as a second user; a content identification section that, by referring to the second storage section, identifies one or more content having ever been purchased or reproduced by the second user; and a content providing section that presents and/or delivers, to the content reproduction apparatus, any of the one or more content, identified by the content identification section, that has not been purchased or reproduced by the first user. Because the content providing server can automatically identify other content having been purchased or reproduced before by the second user presumed to have generally the same taste as the first user, the first user is allowed to readily acquire various music content fitting his or her taste.

According to still another aspect of the present invention, there is provided an improved content reproduction apparatus, which comprises: a communication device that communicatably connects with a content providing server via a communication network; a transmission control section that transmits, to the content providing server, information of a first user requesting delivery of content along with a content delivery request; a reception control section that receives one or more content delivered by the content providing server; a content storage section that stores the content, delivered and received from the content providing server, in an overwriting fashion; an instruction section that instructs, for each of the content stored in the content storage section, whether or not the content should be set in an overwrite-inhibiting state; a control section that controls the content storage section to store the content, delivered and received from the content providing server, in an overwriting fashion without overwriting the content set in the overwrite-inhibiting state; and a reproduction section that reproduces the content stored in the content storage section. With such arrangements, the first user can not only cause user-preferred content, delivered from the server, to be promptly reproduced, but also designate content which the first user wants to remain stored without being overwritten.

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
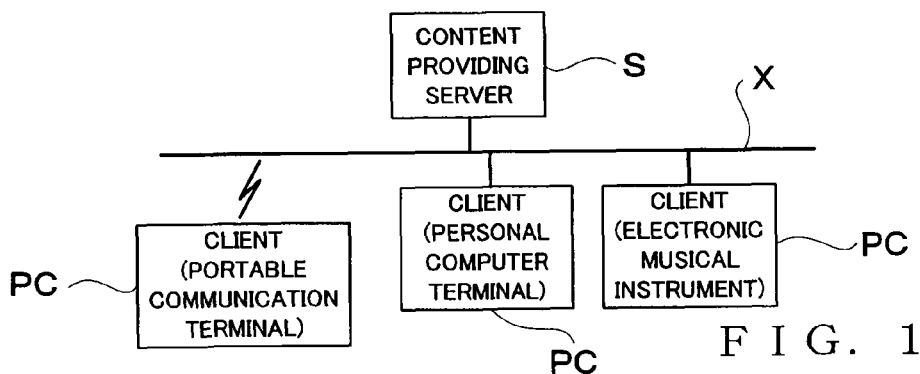
FIG. 1 is a block diagram showing an example general setup of a content delivery system in accordance with an embodiment of the present invention.

FIG. 1 is a block diagram showing an example general setup of a content delivery system in accordance with an embodiment of the present invention. This content delivery system comprises a content providing server S that is a content delivery source for providing a content delivery service, and clients PC (i.e., content reproduction apparatus) that are end users receiving the data delivery service, and these content providing server S and the clients PC are interconnected via an existing communication network X, such as a public telephone line network, Internet or LAN (Local Area Network), for bidirectional communication therebetween. The communication network X, interconnecting the server S and clients PC, is of course not limited to a wired network alone and may include a wireless network, such as a portable telephone line network or satellite communication network. Although the content delivery system of the present invention may include other hardware components in addition to those shown in FIG. 1, it will be described hereinbelow in relation to a case where only minimum necessary resources are employed in the content delivery system.

The clients PC are electronic music apparatus equipped with a reproduction/display function and communication function, such as portable communication terminals like portable phones and PDAs, personal computer terminals and electronic musical instruments. Through the communication function, each of such clients PC can access a desired server S, connected to the communication network X and providing a predetermined content delivery service, in response to direct or indirect entry, by the user, of a URL, i.e. network address comprising predetermined character string, etc. or in response to automatic entry of a preset URL etc.

As will be later detailed, each of the clients PC can transmit various kinds of requests, such as a content delivery request and purchase request (see FIGS. 6 and 7), in response to which it can receive, from the server S, page description information pertaining to displays of a "top screen" (not shown) of the content delivery service, "automatically-delivered content reproduction screen" (see FIG. 5), etc., receive presentation or delivery of music content (more specifically, sample or trial data) selected automatically by the server S and fitting a user's taste and receive music content (more specifically, purchasing data (see FIG. 3)) for which the user has gone through a predetermined purchase procedure. Further, through the reproduction/display function, each of the clients PC can automatically perform music pieces and visually display musical scores on the basis of various music content (trial data or purchasing data) presented or delivered by the server S.

The sever S, on the other hand, is a server computer, which has prestored therein a multiplicity of (items of) page description information and music content. In response to various requests from the clients PC having accessed the server S via the communication network X, the server S returns, to the clients PC, the page description information and music content corresponding to the requests. For example, when any one of the clients PC has made a predetermined content delivery request to the server S, the server S automatically selects music content, fitting a taste of the user of the client PC, and presents or delivers the selected music content to the client PC, as will be later detailed.

Note that, in the content delivery system, a multiplicity of clients PC and servers S may be connected to the communication network X for communication via the network X; however, the following description will be made primarily in relation to the case where one server S is connected to the communication network X, for simplicity of description.

Communication (i.e., transmission/reception) of various information, such as page description information and music content, between the clients PC and server S may of course be performed using a predetermined software program, such as an Internet browser, as conventionally known.

Further, the clients PC are not necessarily limited to portable communication terminals, personal computer terminals and electronic musical instruments and may be any other apparatus, such as automatic performance apparatus like karaoke apparatus and automatic player pianos and game apparatus, as long as they can communicate various information with the server S and process the various information.

Figure 2:
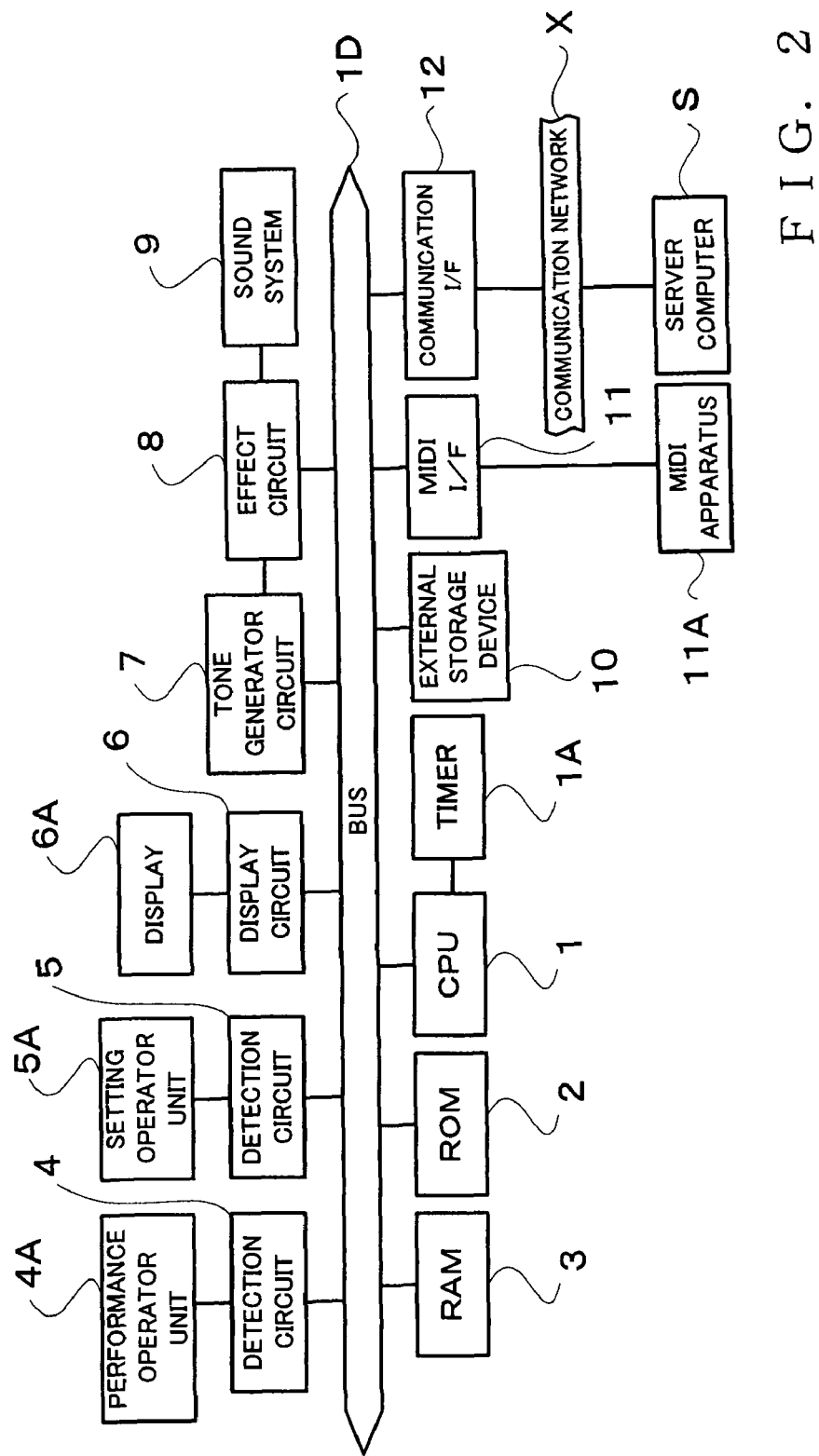
FIG. 2 is a block diagram showing an example hardware general setup of any one of clients and server constituting the content delivery system.

Next, a description will be made about example hardware setups of the clients PC and server S, with reference to FIG. 2. Because each of the clients PC and server S may comprise a similar hardware setup, the following paragraphs representatively describe the hardware of one of the clients PC, assuming that the client PC is in the form of an electronic musical instrument.

In the instant embodiment, the electronic musical instrument (client PC) is controlled by a microcomputer comprising a microprocessor unit (CPU) 1, a read-only memory (ROM) 2 and a random-access memory (RAM) 3. The CPU 1 controls all operations of the entire musical instrument. To the CPU 1 are connected, via a data and address bus 1D, the ROM 2, RAM 3, detection circuits 4 and 5, display circuit 6, tone generator circuit 7, effect circuit 8, and external storage device 10, MIDI interface (I/F) 11 and communication network (I/F) 12. Also connected to the CPU 1 is a timer 1A for counting various times, for example, to signal interrupt timing for timer interrupt processes. Namely, the timer 1A generates clock pulses, and such clock pulses generated by the timer 1A are given to the CPU 1 as processing timing instructions or as interrupt instructions. In accordance with these instructions, the CPU 1 performs not only processes, such as a manual performance and automatic performance, like those performed by the conventionally-known electronic musical instruments, but also various processes pertaining to acquisition, from the server S via the communication network X, of music content.

The ROM 2 has prestored therein various programs to be executed by the CPU 1 and various data. The RAM 3 is used as a working memory for temporarily storing one or more user-preferred music content delivered from the server S, various data generated as the CPU 1 executes a predetermined program, and various other data. The RAM 3 is also used as a memory for storing the currently-executed program and data related thereto, etc. Predetermined address regions of the RAM 3 are allocated to various functions and used as registers, flags, tables, memories, etc. Performance operator unit 4A is, for example, in the form of a keyboard having a plurality of keys for selecting pitches of tones, which also includes key switches in corresponding relation to the keys. The performance operator unit (e.g., keyboard) 4A can be used not only for a manual performance by the user or human player, but also as a means for setting various performance parameters, such as a tone color and effect, to be used in the electronic musical instrument. The detection circuit 4 detects depression and release of the keys on the performance operator unit 4A to thereby produce detection outputs. Setting operator unit 5A includes switches for setting various performance parameters like those employed in the conventional electronic instruments, and switches for designating music content the user wants to test-listen to or purchase. Needless to say, the setting operator unit 5A may include various other operators than the above-mentioned, such as a numeric keypad for inputting numerical value data, a keyboard for inputting text or character data, a mouse for operating a pointer displayed on a display 6A, etc. The detection circuit 5 detects operational states of the above-mentioned switches to output switch information, corresponding to the detected operational states, to the CPU 1 via the data and address bus 1D.

Figure 5:
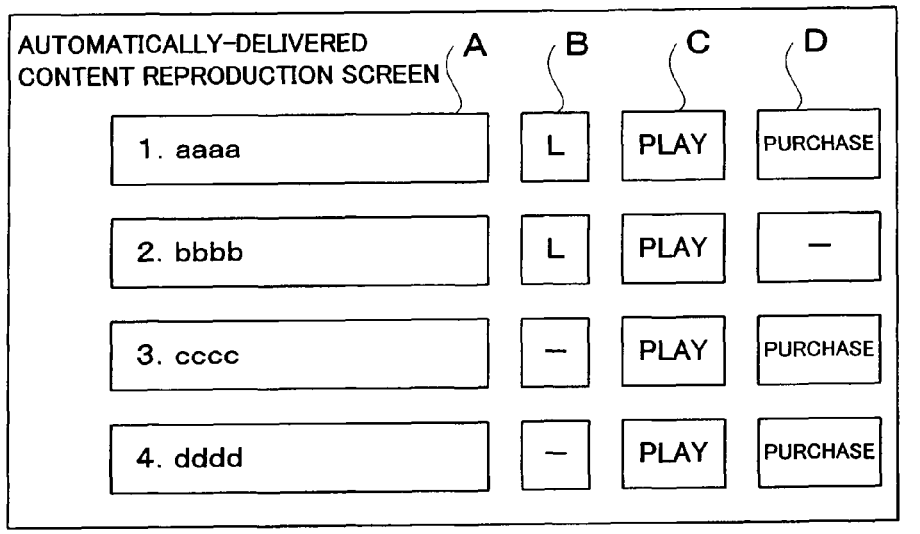
FIG. 5 is a conceptual diagram showing an example of an "automatically-delivered content reproduction screen"

The display circuit 6 visually displays, on the display 6A that is, for example, in the form of a liquid crystal display (LCD) panel or CRT, various screens, such as a later-described "automatically-delivered content reproduction screen" (FIG. 5). Once any of displayed operators (i.e., software switches) is touched or operated by the user on the "automatically-delivered content reproduction screen", a function corresponding to the operated operator is carried out. Of course, on the display 6A, there can be displayed other information, such as a list of music content (purchasing data sets (see FIG. 3)) having ever been purchased by the user, types and current settings of performance parameters, musical score and controlling states of the CPU 1.

The tone generator (T.G.) circuit 7, which is capable of simultaneously generating a plurality of tone signals in a plurality of channels, receives performance information generated in response to operation, by the human operator, of the performance operator unit 4A and supplied via the data and address bus 1D or generated through reproduction of music content. Each tone signal thus generated by the tone generator circuit 7 is audibly reproduced or sounded by a sound system 9 including amplifiers and speakers. The external storage device 10 stores therein various data, such as music content delivered and received from the server S and control-related data like various control programs to be executed by the CPU 1. The external storage device 10 may comprise a hard disk (HD) or any of various removable-type media, such as a flexible disk (FD), compact disk (CD-ROM or CD-RAM), magneto-optical disk (MO) and digital versatile disk (DVD), and a semiconductor memory, such as a flash memory.

The MIDI interface (I/F) 11 is provided for inputting performance data of the MIDI format (MIDI data) from an externally-connected other MIDI apparatus 11A or the like to the musical instrument and for outputting performance data of the MIDI format (MIDI data) from the musical instrument to the externally-connected other MIDI apparatus 11A or the like. Note that the other MIDI apparatus 11A may be of any type (or operating type), such as a keyboard type, string instrument type, wind instrument type, percussion instrument type or body-attachable type, as long as it can generate MIDI data in response to manipulations, by the human operator, of the MIDI apparatus 11A. The communication interface 12 is an interface connected, for example, to the wired or wireless communication network X, such as a LAN, Internet and/or telephone line network and connected via the communication network X to the server (server computer) S to communicate various information with the server S.

The aforementioned electronic music apparatus is not necessarily limited to the type where the performance operator unit 4A, display 6A, tone generator circuit 7, etc. are incorporated together within the body of the electronic music apparatus; for example, the electronic music apparatus may be constructed in such a manner that the above-mentioned components are provided separately and interconnected via communication facilities such as a MIDI interface, network and/or the like.

Note that, unlike the clients PC, the server S need not necessarily include, in the hardware setup, the performance operator unit 4A, tone generator circuit 7, effect circuit 8 and sound system 9, MIDI interface 11.

Next, a description will be given about data stored in the server S, with reference to FIGS. 3A and 3B that conceptually show examples of data stored in the server S. More specifically, FIG. 3A shows a data structure of a content database having a multiplicity of (items of) music content stored therein, and FIG. 3B shows a data structure of a database having a multiplicity of (items of) information pertaining to individual users.

Figure 3A:
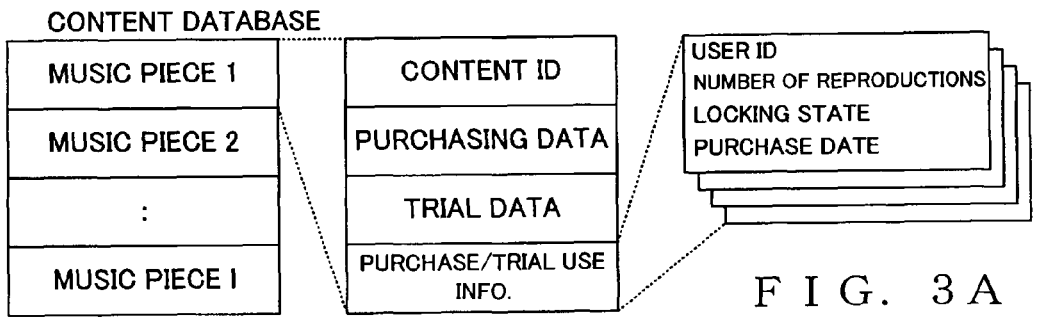
FIG. 3A is a conceptual diagram showing data stored in the server, which particularly shows a data structure of a content database.

In the content database, as shown in FIG. 3A, the multiplicity of music content, each representative of a music piece, are stored and managed on a music-piece-by-music-piece basis (i.e., individually for music piece 1, music piece 2, ..., music piece 1). Each content ID is information uniquely identifying one of the deliverable music content stored in the server S; more specifically, each content ID is a unique identification number assigned to the deliverable music content. With such a unique content ID assigned to each of the music content or music pieces, the music content is stored and managed per music piece. The music content stored in the server S can be broadly classified into two types of data sets: purchasing data sets; and trial data sets. Each of the purchasing data sets is a fully-reproducible data set that can be reproduced with no limitation for all performance parts over the entire music piece. Each of the trial data sets, on the other hand, is a partly-limited test-listening data set prepared separately from the corresponding purchasing data set, which comprises, for example, data reproducible for only one or some of performance parts and/or limited in playing or reproducing time. As will be later described in detail, at least one trial data set is delivered, as necessary, from the server S to the client PC as content fitting a user's taste (or "presumed user-preferred content") prior to purchase of the music piece, and the purchasing data set is newly delivered from the server S to the client PC only after completion of a predetermined purchase procedure. Namely, the trial data set and purchasing data set are prepared for each music content, and any one of the trial data set and purchasing data set is delivered depending on whether the predetermined purchase procedure has been completed or not; thus, only limited reproduction of the desired music piece is permitted before the predetermined purchase procedure of the music piece, and non-limited, full reproduction of the desired music piece is permitted only after completion of the predetermined purchase procedure. Note that each of the trial data sets and purchasing data sets contains content-related information, such as the name of the music piece (content name).

Further, to each of the music content is added "purchase/trial use information" that includes a user ID, number of reproductions, locking state and purchase date. The user ID is a unique user identification number assigned to each user who has applied for use of the content delivery service, and such a user ID is stored in the server S only for each user to whom the music content in question (either trial data set or purchasing data set) has ever been delivered before. The number of reproductions is data indicative of how many times the user supplied with the music content has reproduced the music content in question. The locking state is data indicative of whether or not the music content in question is currently locked in an overwrite-inhibiting state. The number of reproductions and locking state will be later described in detail (see FIG. 4). The purchase data is data indicative of the date of purchase when the user has gone through the predetermined purchase procedure of the music content in question. Each user for whom the purchase date has been stored is a user who has already purchased the music content and received delivery, from the server S, of the corresponding purchasing data.

Figure 3B:
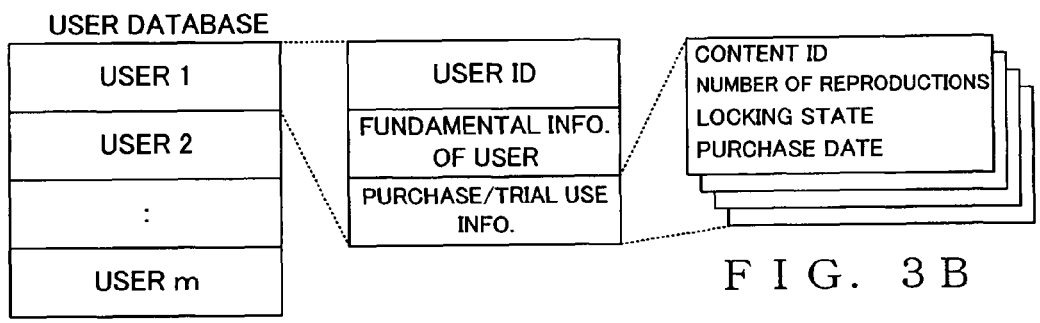
FIG. 3B is a diagram showing a data structure of a user database.

In the user database, as shown in FIG. 3B, the user-related information is stored and managed on a user-by-user basis (i.e., separately for each of user 1, user 2, ..., user m). Each user ID is a unique user identification number assigned to a user who has applied for use of the content delivery service. Fundamental user information comprises personal data, such as the name, age, address, sex and preferred musical genre, of the user entered by the user, for example, in applying for the use of the content delivery service. To each of the users is added "purchase/trial use information" that includes a content ID, number of reproductions, locking state and purchase date. The content ID is a unique identification number assigned to the music content of each music piece, and the user database has stored therein, for each of the users, only the content ID of each music content having ever been delivered to user. The other data than the content ID, included in the "purchase/trial use information", have already been explained in relation to the content database and thus will not be explained here to avoid unnecessary duplication.

Now, a description will be given about a data storage area provided in advance in each of the clients PC for storing music content delivered from the server S as music content fitting a user's taste. Once at least one music content (trial data set) fitting a user's taste (i.e., presumed user-preferred music content) or music content (purchasing data set) for which the user has gone through the predetermined purchase procedure is delivered from the server S, the client PC stores the delivered music content into a predetermined data storage area provided in advance in the RAM 3 (or flash memory or the like). Because the RAM 3 provided in each of the clients PC generally has a very small storage capacity and thus only a small number of music content can be stored at a time in the predetermined data storage area (in the illustrated example of FIG. 3A, "n"<1; "n" is in the order of several dozen while "1" is in the range of several thousands to several tens of thousands), each of the clients PC in the present invention is arranged to rewrite the data storage area each time user-desired (preferred) music content is delivered from the server S (except music content locked in the overwrite-inhibiting state), as will be later described. Namely, when at least one presumed user-preferred music content has been delivered from the server S, music content currently not locked in the overwrite-inhibiting state is erased from the client PC. Further, because the "automatically-delivered content reproduction screen" is displayed on the basis of the music content stored in the predetermined data storage area, the client PC can always display the latest presumed user-preferred music content to the user.

Figure 4:
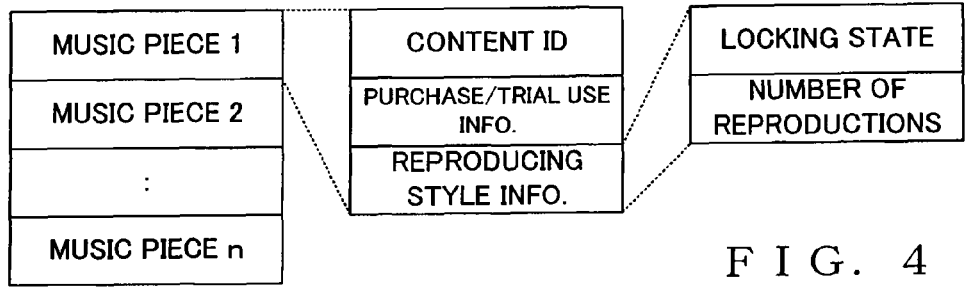
FIG. 4 is a conceptual diagram showing an example of a data storage area provided in advance in a RAM of each of the clients for storing music content delivered from the server.

FIG. 4 is a conceptual diagram showing an example of the data storage area provided in advance in each of the clients PC for storing music content delivered from the server S. As shown, the music content delivered from the server S is stored per music piece (music piece 1, music piece 2, ..., music piece n). The content ID is the ID of the music content (purchasing data set or trial data set) delivered from the server S. The purchasing data set or trial data set constitutes the body of each delivered music content; in the instant embodiment, the purchasing data set or trial data set is stored into the data storage area once at least music content is received from the server S. Namely, the trial data set is stored when at least one presumed user-preferred music content has been received from the server S, while the purchasing data set is stored when at least one music content, for which the user has gone through the predetermined purchase procedure, has been received. Reproducing style information includes data indicative of the locking state and number of reproductions, which is updated in accordance with input operation, by the user, on the "automatically-delivered content reproduction screen" (as will be later detailed). Preferably, upon delivery from the server S, the purchasing data set is stored not only into the data storage area but also into the external storage device 10, such as a flash memory or hard disk, so that the data set will not be deleted from the client PC even when presumed user-preferred content automatically selected by the server S has been newly delivered from the server S.

The following paragraphs describe a screen configuration and operation of the "automatically-delivered content reproduction screen" displayed on the display 6A on the basis of the page description information transmitted from the server S and music content stored in the RAM, with reference to FIG. 5. FIG. 5 is a conceptual diagram showing an example of the "automatically-delivered content reproduction screen". The "automatically-delivered content reproduction screen", which is displayed on the display 6A of a touch panel type, has its displayed contents updated each time presumed user-preferred music content is delivered from the server S.

On the "automatically-delivered content reproduction screen", as shown in FIG. 5, there are displayed a list of music pieces, locking state buttons B, play buttons C, and purchase buttons D corresponding to the music pieces. The list of music pieces lists up the names of music pieces (content names) corresponding to one or more presumed user-preferred music content automatically selected and delivered from the server S. The user can select a desired music piece from among the music pieces presented in the music piece list A to thereby cause the display 6A to display detailed information of the selected music piece other than the music piece name, such as information of the artist (player), lyrics, musical score, lyric writer and composer and playing time. The locking button (i.e., overwrite-inhibiting locking operator) B indicates the lock-on state (i.e., overwrite-inhibiting locked state) by "L" and indicates the lock-off (non-overwrite-inhibiting state) by "-", and this locking button B is operable by the user to set a desired one of the lock-on state and lock-off state. The locking state can be cause to alternate or shift between the lock-on state and the lock-off state per user's operation of the locking button B, and the thus-set locking state is stored into the data storage area (see FIG. 4). When at least one presumed user-preferred music content has been newly received from the server S, the displayed contents of the "automatically-delivered content reproduction screen" are updated in accordance with the newly-delivered music content as long as the overwrite-inhibiting lock is OFF; that is, music content currently set in the lock-on state (i.e., for which the overwrite-inhibiting lock is currently ON) is not overwritten with the newly-delivered music content. The play button (i.e., reproducing operator) C is operable to instruct a start or end of reproduction of the music content in question. Each time the reproduction is carried out in response to operation of the play button C, the latest number of reproductions of the music piece is counted to update the corresponding data in the data storage area (see FIG. 4). The purchase button (i.e., purchasing operator) D is operable by the user to purchase desired music content, and, in response to operation of the purchase button D, the corresponding purchasing data set is delivered from the server S to the client PC for storage in the client PC. Where the purchasing data set has already been delivered to the user, i.e. the music content has already been purchased by the user, the purchase button D indicates "-", and the locking button B indicates "L" (i.e., lock-on state).

Although not specifically shown here, a scroll bar may be provided at a left or right side position of the screen so that the screen can be scrolled in response to operation of the scroll bar. Alternatively, a page-switching button may be provided at a predetermined position of the screen so that the displayed screen can be switched between pages in response to operation of the page-switching button. In another alternative, arrangements may be made such that the cursor movement (and corresponding scroll display) and operation of the various buttons on the screen can be effected in response to operation of the setting operator unit 5A (particularly, the mouse).

Figure 6:
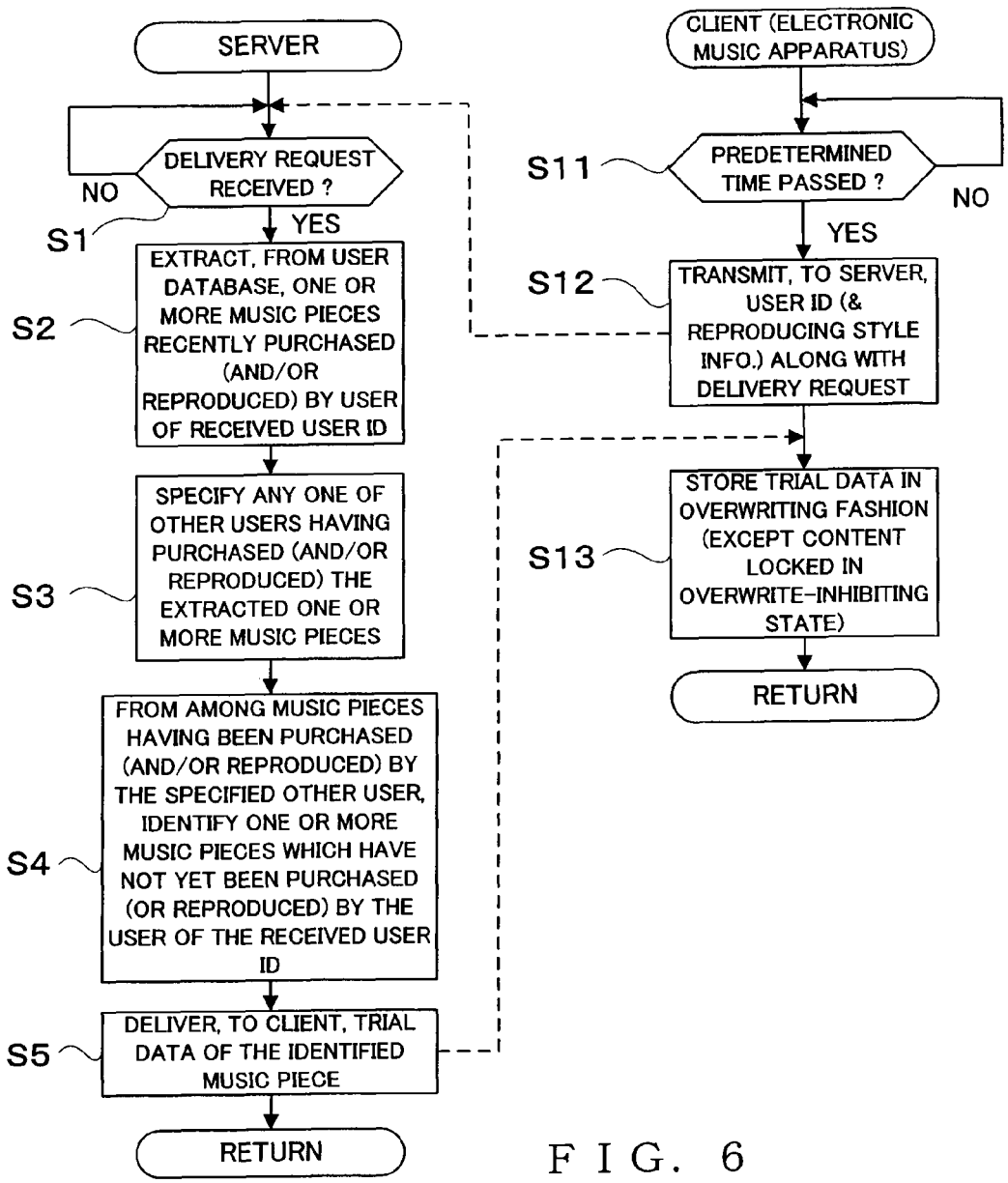
FIG. 6 is a flow chart outlining content delivery processing performed by the client and server.

Now, with reference to FIG. 6, a description will be given about a series of operations, from a start of user access to acquisition of presumed user-preferred music content, performed by any one of the clients PC and content providing server S constituting the content delivery system shown in FIG. 1. FIG. 6 is a flow chart outlining content delivery processing performed by the client PC and server S. Each of the processing, which is based on a software program executed in the client PC or server S shown in FIG. 1, is always placed in a predetermined standby state after the start of the program. The processing in the server S is started up upon receipt of a content delivery request from the client PC, while the processing in the client PC is started up at predetermined time intervals irrespective of whether or not the user has performed predetermined operation. Note that FIG. 6 shows the processing after the server S providing the content delivery service has been accessed on the basis of designation of the URL. Further, although, in practice, the client PC and server S perform the processing, from the user access start to the content acquisition, independently of each other, the following paragraphs describe the processing in the client PC and server S along a series of processing flows, to facilitate understanding. Namely, because various operations are performed in parallel by the client PC having made an access request and the server S having received the access request while communicating predetermined information therebetween, the operations will be explained sequentially in accordance with flows of the communicated information.

First, in the client PC, a determination is made, at step S11, as to whether a predetermined time has passed from the end of the last processing cycle. If the predetermined time has passed (YES determination at step S11), the client PC transmits, via the communication network X, the user ID (and reproducing style information) and content delivery request to the server S that provides the desired content delivery service, at step S12. The server S is always making a determination as to whether a content delivery request has been received from the client PC, and it waits execution of the processing until a new content delivery request is received from the client PC (step S1). Once such a content delivery request is received from the client PC (YES determination at step S1), the server S extracts, from the user database, one or more music pieces which the user corresponding to the received user ID has recently purchased (and/or reproduced), at step S2. Namely, the server S identifies, by referring to the user database (see FIG. 3B) on the basis of the received user ID, the user (in this case, "first user") having accessed the server S using the client PC, and then it extracts, on the basis of the purchase/trial use information of the identified user, the content IDs of one or more music pieces recently purchased by the user (i.e., one or more music pieces whose purchase dates are relatively recent) and/or one or more music pieces reproduced by the user (i.e., music pieces of which the overwrite-inhibiting state is the lock-on state or of which the number of reproductions is greater than a predetermined number).

At step S3, the server S specifies, as a second user, any one of other users (user IDs) having ever purchased or reproduced the extracted one or more music pieces (content IDs), by referring to the content database (see FIG. 3A). For example, the specification of any one of the other users may be performed in the following ways. Where only one music piece has been extracted, any one of other users having every purchased or reproduced the extracted more music piece is specified as the second user. Where a plurality of music pieces have been extracted, any one of users having the highest coincidence, in music piece preference, with the first user among other users having ever purchased or reproduced the extracted more music pieces is specified randomly. For example, where three music pieces have been extracted and if there are other users having purchased all of the three music pieces, one of the other users is specified, but, if there is no other user having every purchased or reproduced all of the three music pieces, then one of other users having purchased two of the three music pieces is specified. Needless to say, the specification may be performed in any other suitable way than the aforementioned. Range of the above-mentioned other users to be found may be narrowed in advance on the basis of the fundamental user information (such as, age, sex and living area) stored in the user database (see FIG. 3B).

At step S4, by referring to the user database and content database, the server S identifies, from among music pieces having ever been purchased (or reproduced) by the second user, one or more music pieces which have not yet been purchased (or reproduced) by the first user (i.e., user identified by the received user ID). Namely, the server S refers to the user database to identify one or more music pieces having been purchased by the specified second user and then refers to the content database to identify one or more of the identified music pieces which have not yet been purchased (or reproduced) by the first user. At step S5, the trial data set of each of the music pieces identified at step S4 is transmitted to the client PC along with the page description information of the "automatically-delivered content reproduction screen". On receipt of the trial data set transmitted from the server S, the client PC stores the received trail data set in an overwriting fashion unless the music piece is currently locked in the overwrite-inhibiting state (step S13). Namely, when a content delivery request has been received from the client PC connected to the server S via the communication network X, the server S refers to the user database and content database to automatically select one or more music pieces that are presumed to be preferred by the user having accessed the server S and then transmits the trial data sets of the presumed user-preferred music pieces to the client PC having made the content delivery request.

Figure 7:
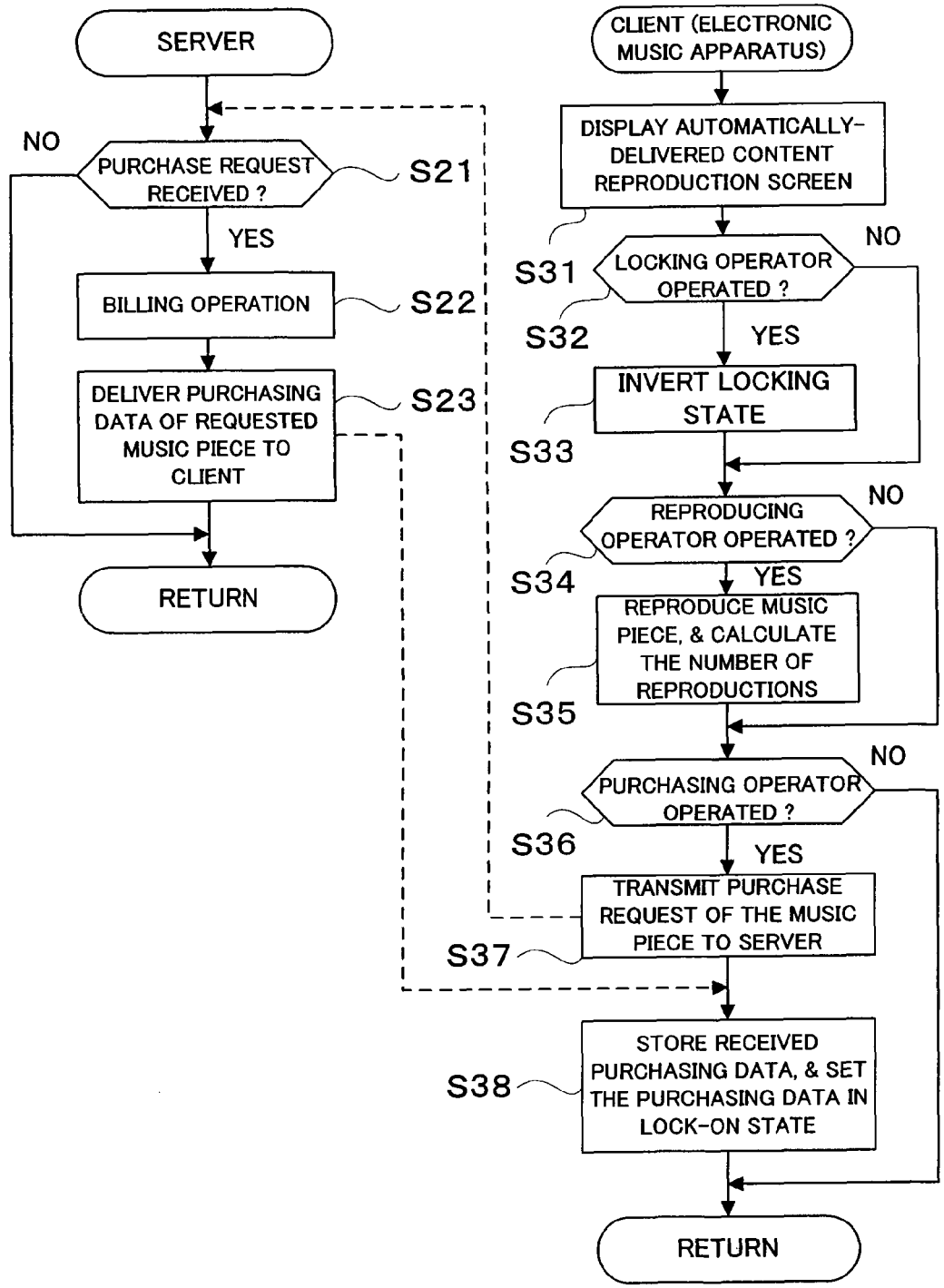
FIG. 7 is a flow chart outlining screen-operation-responsive processing performed by the client and server.

Next, with reference to FIG. 7, a description will be given about a series of operations performed in the client PC and server S in response to operation of various buttons on the "automatically-delivered content reproduction screen" (see FIG. 5). FIG. 7 is a flow chart outlining screen-operation-responsive processing performed by the client PC and server S. This processing too will be described along a series of processing flows, to facilitate understanding.

At step S31, the client PC displays, on the display 6A, the "automatically-delivered content reproduction screen" on the basis of the page description information (see step S5 of FIG. 6) and music content (one or more trial data sets) delivered from the server S. Then, a determination is made as to whether any one of the buttons has been operated on the displayed "automatically-delivered content reproduction screen" (step S32, step S34 or step S36). If the overwrite-inhibiting locking operator (i.e., locking button B) has been operated (YES determination at step S32), the overwrite-inhibiting locking state is inverted into the lock-on state or lock-off state. If the reproducing operator (i.e., play button C) has been operated (YES determination at step S34), one of the automatically-delivered music pieces or purchased music piece (one of the trial data sets or purchasing data set) is reproduced and the number of reproductions having been performed so far on the music piece is calculated, at step S35; in this case, the number of reproductions having been performed so far for a latest predetermined time period (e.g., for the last several days) may be calculated with every reproduction performed preceding the predetermined time period excluded. In this case, all reproductions performed within one day may be counted as one reproduction, or each reproduction performed may be counted as one reproduction. Further, if the purchasing operator (i.e., purchase button D) has been operated (YES determination at step S36), the client PC transmits a purchase request of a music piece to the server S, at step S37. The server S is always monitoring whether or not a purchase request has been received (step S21), and, when such a purchase request has been received (YES determination at step S21), the server S performs a billing operation and then delivers to the client PC the purchasing data set of the requested music piece (step S22 and step S23). Upon receipt of the purchasing data set from the server S, the client PC stores the received purchasing data set into the predetermined data storage area of the RAM 3 (see FIG. 4) and the external storage device 10, such as a flash memory or hard disk, and also sets the overwrite-inhibiting locking state of the purchasing data set, having been stored in the predetermined data storage area, to the lock-on state (step S38).

As set forth above, the instant embodiment is arranged to specify the second user having ever purchased or reproduced the same music content as purchased or reproduced by the first user, then identify other music content which the second user has purchased or reproduced before, and thence transmits the identified music content to the first user. In this way, music content which the second user, presumed to have the same preference or taste as the first user, has purchased or reproduced before is transmitted to the first user, so that the first user is allowed to readily acquire various music content, fitting his or her taste, without performing any particular operation. Further, such automatic music content delivery is carried out periodically, and the thus-delivered music content is automatically accumulated into the electronic musical instrument being used by the first user. Thus, the first user can newly acquire preferred music content on the periodic basis. Furthermore, because the automatically-delivered music content is automatically accumulated into the electronic musical instrument, the first user can cause any one of the automatically-delivered music content to be promptly reproduced at any desired time. Such arrangements of the instant embodiment have advantages over the conventionally-known arrangements where music content is downloaded or delivered in a stream after the user transmits a delivery request. In such conventionally-known arrangements employing the downloading or stream-delivery responsive to the delivery request, there would be a time lag from the time of the request (particularly, purchase request) to the time when the reproduction of the content can be started, and, in addition, the stream-delivery tends to be instable.

The above-described processing is performed by the respective CPUs 1 of the server S and client PC executing predetermined computer software programs. Alternatively, the above-described processing may of course be implemented by microprograms for execution by a DSP (Digital Signal Processor), rather than by such computer software programs. In another alternative, the processing may be implemented by a dedicated hardware apparatus that includes discrete circuits or integrated or large-scale integrated circuitry built therein, rather than by the above-mentioned programs.

Note that, as regards presumed user-preferred content, the server S may present only a list of presumed user-preferred content without delivering the content (one or more trial data sets). In such a case, the server S may deliver desired content in response to user's designation of the desired content from among the listed content; for example, the content delivery may be initiated in response to user's operation of the play button C on the "automatically-delivered content reproduction screen" (see FIG. 5).

Further, the timing for acquiring content from the server S may be any desired timing, e.g. every hour, every day or every week, or the timing may be at variable time intervals rather than fixed uniform time intervals. In an alternative, content from the server S may be acquired each time the client PC accesses the server S.

Further, presumed user-preferred content may be acquired either at uniform time intervals as long as the power supply of the client PC is ON. Alternatively, the client PC may be normally held in a standby state in such a manner that the client PC is automatically powered periodically through timer operation to acquire presumed user-preferred content and automatically returned to the standby state after completion of the content acquisition.

Furthermore, whereas the music content designating operators etc. have been described above as software switches displayed on the display 6A, they may be physical switches. Furthermore, the display 6A is not limited to the touch panel type and may be of a type that performs an operation on any of displayed objects in response to user's operation of any one of physical switches provided near the displayed objects or in response to user's operation of the mouse.

In the case when given music content is to be locked in the overwrite-inhibiting state, the content may be locked only for a limited time period instead of being kept locked until released from the overwrite-inhibiting state in response to predetermined operation by the user; for example, the overwrite-inhibiting lock of given music content may be automatically released or unlocked upon lapse of, for example, 72 hours after the locking in such a manner that the given music content can not be locked again the overwrite-inhibiting state.

Furthermore, whereas the preferred embodiment has been described above in relation to the delivery of music content comprising performance data of the MIDI format, audio data, musical score data or the like, content delivered from the server S to the client PC may be any desired content comprising video/image data, text data or other data that can be communicated via the communication network X and used on the client PC.

What is claimed is:

1. A content delivery system for communicating content between a content reproduction apparatus and a content providing server interconnected via a communication network, said content delivery system comprising:

a content providing server comprising: a communication device that communicably connects with a content reproduction apparatus via a communication network; a first storage section that stores a plurality of content and stores, for each of the content, one or more users having ever purchased or reproduced the content;

a second storage section that stores, for each of a plurality of users, information indicative of content having ever been purchased or reproduced by the user;

a reception control section that receives, from the content reproduction apparatus, information of a first user requesting delivery of content along with a content delivery request;

an extraction section that, by referring to said second storage section on the basis of the information of said first user received by said reception control section, extracts information indicative of one or more content having ever been purchased or reproduced by said first user;

a user specification section that, by referring to said first storage section on the basis of said information indicative of one or more content extracted by said extraction section, searches for one or more other users than said first user who have ever purchased the extracted one or more content, and that specifies any one of the searched-out other users as a second user;

a content identification section that, by referring to said second storage section, identifies one or more content having ever been purchased or reproduced by said second user identified by said user specification section; and a content providing section that presents and/or delivers, to the content reproduction apparatus, any of the one or more content, identified by said content identification section, that has not been purchased or reproduced by said first user; and a content reproduction apparatus comprising:
a communication device that communicatably connects with a content providing server via a communication network;
a transmission control section that transmits, to the content providing server, information of a first user requesting delivery of content along with a content delivery request;
a reception control section that receives one or more content delivered by the content providing server;
a content storage section that stores the content, delivered and received from the content providing server, in an overwriting fashion;
a reproduction section that reproduces the content stored in said content storage section;
wherein said content reproduction apparatus further comprises: an instruction section that instructs, for each of the content stored in said content storage section, whether or not the content should be set in an overwrite-inhibiting state; and
a control section that controls said content storage section to store the content, delivered and received from said content providing server, in an overwriting fashion without overwriting the content set in the overwrite-inhibiting state.

2. A content providing server comprising: a communication device that communicatably connects with a content reproduction apparatus via a communication network;
a first storage section that stores a plurality of content and stores, for each of the content, one or more users having ever purchased or reproduced the content;
a second storage section that stores, for each of a plurality of users, information indicative of content having ever been purchased or reproduced by the user;
a reception control section that receives, from the content reproduction apparatus, information of a first user requesting delivery of content along with a content delivery request;
an extraction section that, by referring to said second storage section on the basis of the information of said first user received by said reception control section, extracts information indicative of one or more content having ever been purchased or reproduced by said first user;
a user specification section that, by referring to said first storage section on the basis of said information indicative of one or more content extracted by said extraction section, searches for one or more other users than said first user who have ever purchased the extracted one or more content, and that specifies any one of the searched-out other users as a second user;
a content identification section that, by referring to said second storage section, identifies one or more content having ever been purchased or reproduced by said second user; and
a content providing section that presents and/or delivers, to the content reproduction apparatus, any of the one or more content, identified by said content identification section, that has not been purchased or reproduced by said first user,
wherein said first storage section stores test-listening data having a reproduction limitation and purchasing data having no reproduction limitation, and said content providing section delivers the test-listening data as content fitting a taste of said first user.

3. A non-transitory computer-readable storage medium storing a program that, when executed by a computer of a server apparatus, capable of communicating with a content reproduction apparatus via a communication network, causes the computer to perform a content providing procedure, said content providing procedure comprising: a step of communicatably connecting with a content reproduction apparatus via a communication network;
a step of storing a plurality of content into a predetermined first storage section and also storing, for each of the content, one or more users, having ever purchased or reproduced the content, into the predetermined first storage section;
a step of storing, for each of a plurality of users, information indicative of content, having ever been purchased or reproduced by the user, into a predetermined second storage section;
a step of receiving, from the content reproduction apparatus, information of a first user requesting delivery of content along with a content delivery request;
an extraction step of, by referring to said second storage section on the basis of the information of said first user received by said step of receiving, extracting information indicative of one or more content having ever been purchased or reproduced by said first user;
a step of, by referring to said first storage section on the basis of said information indicative of one or more content extracted by said extraction step, searching for one or more other users than said first user who have ever purchased the extracted one or more content, and then specifying any one of the searched-out other users as a second user;
an identification step of, by referring to said second storage section, identifying one or more content having ever been purchased or reproduced by said second user; and
a step of presenting and/or delivering, to the content reproduction apparatus, any of the one or more content, identified by said identification step, that has not been purchased or reproduced by said first user,
wherein said first storage section stores test-listening data having a reproduction limitation and purchasing data having no reproduction limitation, and said content providing section delivers the test-listening data as content fitting a taste of said first user.

* * * * *